United States Patent
Anderson et al.

(10) Patent No.: US 11,273,752 B2
(45) Date of Patent: Mar. 15, 2022

(54) ILLUMINATION CONTROL SYSTEM FOR MOBILE MACHINES

(71) Applicant: Caterpillar Paving Products Inc., Brooklyn Park, MN (US)

(72) Inventors: Bradley D. Anderson, Rogers, MN (US); Vamsi K. Doddakula, Dunlap, IL (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 228 days.

(21) Appl. No.: 16/382,977

(22) Filed: Apr. 12, 2019

(65) Prior Publication Data

US 2020/0324688 A1 Oct. 15, 2020

(51) Int. Cl.
*B60Q 1/14* (2006.01)
*H05B 45/10* (2020.01)
*H05B 47/19* (2020.01)

(52) U.S. Cl.
CPC ........... *B60Q 1/1423* (2013.01); *H05B 45/10* (2020.01); *H05B 47/19* (2020.01); *B60Q 2300/42* (2013.01)

(58) Field of Classification Search
None
See application file for complete search history.

(56) References Cited

U.S. PATENT DOCUMENTS

| | | | |
|---|---|---|---|
| 4,862,037 A | 8/1989 | Farber et al. | |
| 5,921,708 A * | 7/1999 | Grundl | E01C 19/48 180/168 |
| 6,379,013 B1 | 4/2002 | Bechtel et al. | |
| 6,403,942 B1 | 6/2002 | Stam | |
| 7,004,606 B2 * | 2/2006 | Schofield | B60Q 1/1423 362/460 |
| 8,337,118 B2 * | 12/2012 | Buschmann | E01C 19/48 404/84.5 |
| 8,536,802 B2 * | 9/2013 | Chemel | H05B 47/155 315/307 |
| 8,538,636 B2 * | 9/2013 | Breed | G01S 7/417 701/49 |
| 9,404,630 B2 | 8/2016 | Foltin | |
| 9,957,675 B2 | 5/2018 | Marsolek et al. | |
| 10,613,524 B2 * | 4/2020 | Marsolek | G07C 5/0841 |
| 2007/0253597 A1 | 11/2007 | Utida et al. | |
| 2010/0213846 A1 * | 8/2010 | Thomas | B60Q 1/1423 315/82 |

(Continued)

*Primary Examiner* — James J Lee
*Assistant Examiner* — Wenyuan Yang
(74) *Attorney, Agent, or Firm* — Leydig, Voit & Mayer, Ltd.

(57) ABSTRACT

An illumination control system for a mobile machine that operates in coordination with other mobile machines is configured to adjust an illumination lamp disposed on the mobile machine and directed in a travel direction of the machine. The illumination control system includes a positioning/location device that can determine a proximity distance between the mobile machine and a second mobile machine approaching in the travel direction. The illumination control system also includes an electronic controller configured to adjust the illumination device based on the proximity distance as determined. The illumination control system may find particular usefulness in paving and/or milling operations.

20 Claims, 3 Drawing Sheets

(56) References Cited

U.S. PATENT DOCUMENTS

| | | | |
|---|---|---|---|
| 2011/0063861 A1* | 3/2011 | Edgeworth | B60Q 1/143 |
| | | | 362/466 |
| 2013/0076101 A1* | 3/2013 | Simon | G05D 1/0293 |
| | | | 299/39.2 |
| 2014/0186115 A1 | 7/2014 | Graham et al. | |
| 2015/0145700 A1* | 5/2015 | Beggs | G08G 1/005 |
| | | | 340/944 |
| 2016/0024726 A1 | 1/2016 | Anderson | |
| 2016/0170415 A1* | 6/2016 | Zahr | E01C 19/004 |
| | | | 701/23 |
| 2016/0326724 A1* | 11/2016 | Hartman | H05B 47/105 |
| 2017/0167089 A1* | 6/2017 | Marsolek | G06Q 50/08 |
| 2017/0246988 A1 | 8/2017 | Ihedinmah | |
| 2018/0142427 A1 | 5/2018 | Tkachenko et al. | |
| 2019/0225139 A1* | 7/2019 | Kambara | B60Q 1/1423 |
| 2019/0338473 A1* | 11/2019 | Buschmann | G01F 23/0076 |

* cited by examiner

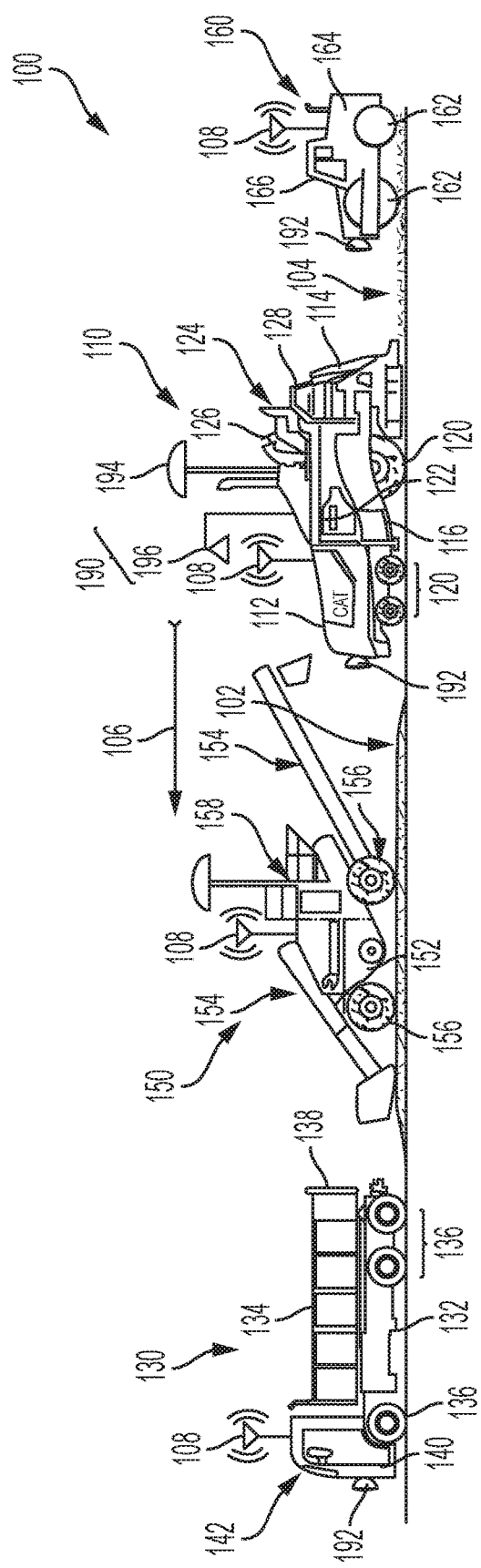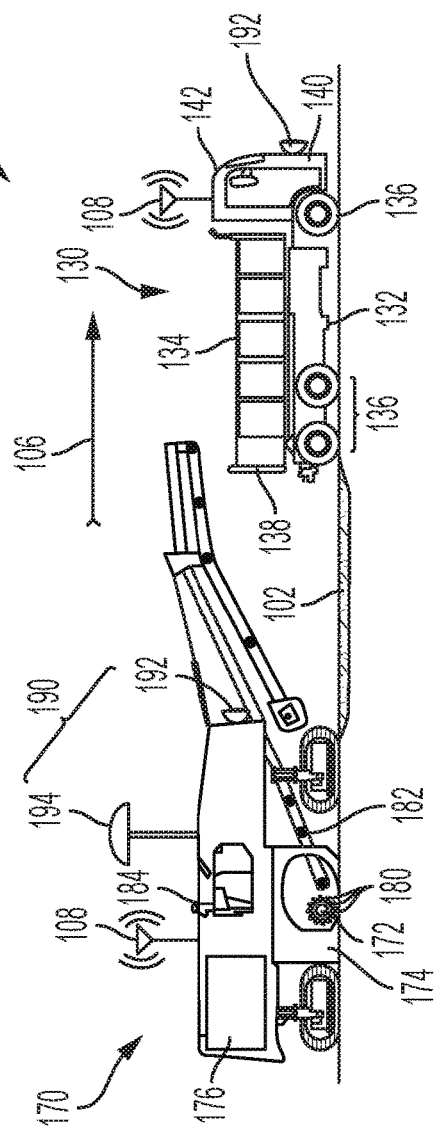
FIG. 1
FIG. 2 ved in the form of a pre-recorded illuminated video or image on the device. The present disclosure will now be described with reference to the accompanying figures, in which preferred embodiments are shown. However, it should be understood that the disclosure is not intended to be limited to the embodiments described.

ILLUMINATION CONTROL SYSTEM FOR MOBILE MACHINES

TECHNICAL FIELD

This patent disclosure relates generally to a machine for road working operations and the like and more particularly to a control system and method for operating a plurality of machines during such operations.

BACKGROUND

Road working, construction, mining, and similar operations such as, for example, the paving or milling of roadways, require the use of mobile machines to perform various tasks. Such operations are also extensively performed at night to avoid burdening daytime traffic or for efficient around-the-clock operation. Night operations generally require artificial light for enhanced visibility about the worksite. Mobile machines may be equipped with headlamps for improved visibility and additional work lighting may be provided about the worksite. These operations also require the use of a plurality of different mobile machines specifically configured for different tasks that must work in conjunction with each other to cooperatively complete the operation. For example, haul trucks may be used to transport asphalt and other paving material to and from the worksite while pavers and cold planers may be used to distribute or remove material from the worksite. Similarly, in a mining or construction operation, excavators may dig material from a worksite and transfer the material to a haul truck for removal. Because the mobile machines are independently driven units with dedicated onboard operators independently moving about the worksite in close proximity, attention must be directed to the coordination and control of the plurality of mobile machines. U.S. Pat. No. 9,957,675 describes one example of a method for the cooperative interoperation of a cold planer and a haul truck utilizing sensors. The present disclosure is similarly directed to a system and method of cooperatively coordinating the operation of a plurality of mobile machines, including the coordination of such machines during night operations.

SUMMARY

The disclosure describes, in one aspect, an illumination control system for a first mobile machine used in cooperation with other mobile machines. The illumination control system controls an illumination lamp disposed on the first mobile machine and directed in a travel direction of the first mobile machine. The illumination control system also includes a positioning/location device disposed on the first mobile machine configured to determine a proximate distance of the first mobile machine with respect to a second mobile machine traveling in the travel direction to cooperatively interact with the first mobile machine in conducting an operation. An electronic controller may be configured to adjust the illumination lamp disposed on the first mobile machine based on the proximate distance as determined.

In another aspect, the disclosure describes a method of controlling illumination lamps on a first mobile machine by initially illuminating at least a portion of a worksite with at least one illumination lamp disposed on a first mobile machine. According to the method, a second mobile machine may approach the first mobile machine to cooperatively interact with it in performing an operation. The method therefore determines a proximity distance between the first mobile machine and the second mobile machine and, as a result, may adjust the illumination lamp based on the proximity distance.

In yet another aspect, the disclosure describes a first mobile machine configured for cooperative interaction with a second mobile machine. The first mobile machine can also include an illumination lamp directed in a travel direction of the first mobile machine. To coordinate cooperative interaction between the first and second mobile machines, the first mobile machine can include a locating/positioning device configured to receive a signal used to determine a proximate distance between the first mobile machine and a second mobile machine approaching in the travel direction. The first mobile machine can also include an electronic controller configured to adjust the illumination lamp based on the proximity distance.

BRIEF DESCRIPTION OF THE DRAWINGS

FIG. 1 is a side elevational view of an exemplary road working operation including a plurality of mobile machines operating in proximity with each other in accordance with an embodiment of the disclosure.

FIG. 2 is a side elevational view of another example of a road working operation including a cold planer operating in proximity to a haul truck.

DETAILED DESCRIPTION

Figure 3:
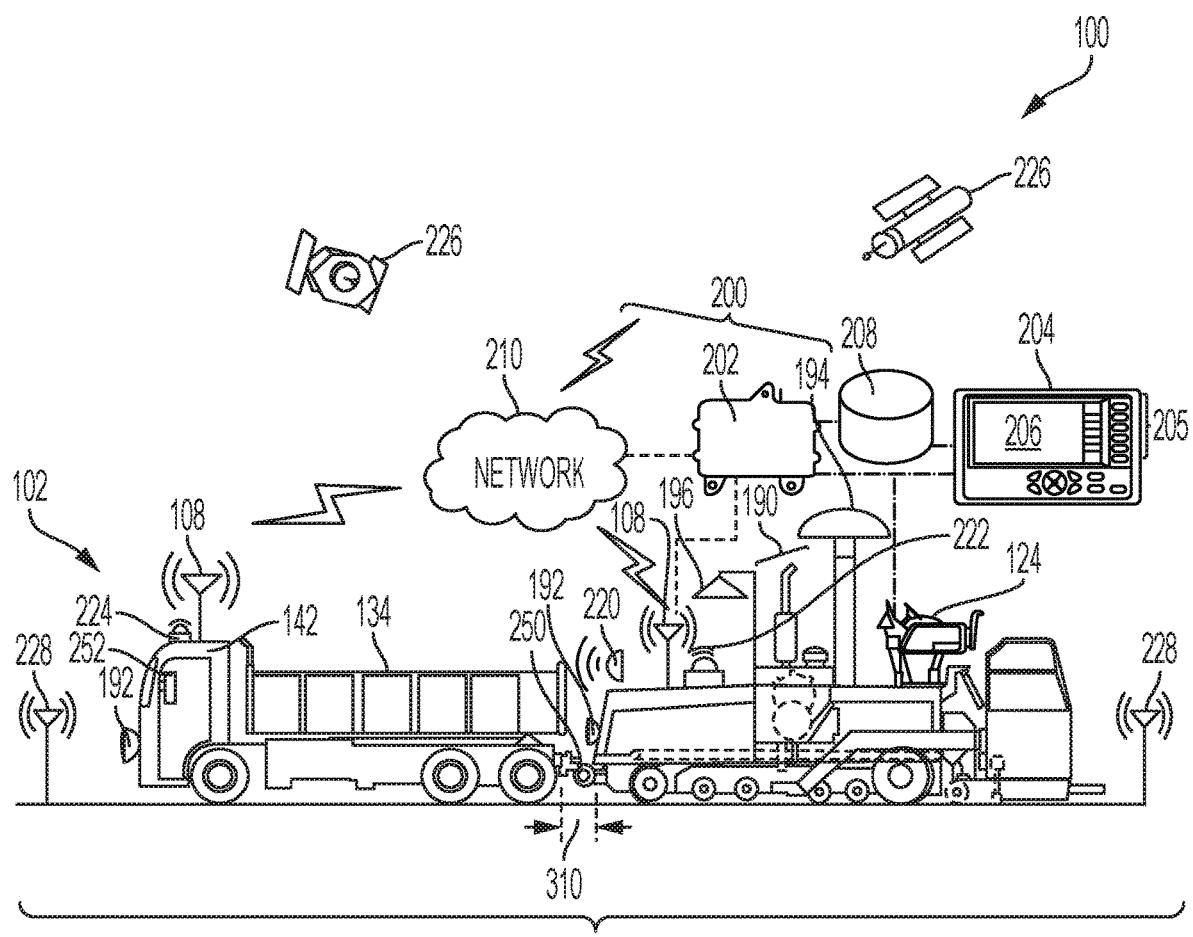
FIG. 3 is a diagrammatic illustration of a possible example of an illumination control system in accordance with the disclosure for coordinating the proximate operation of a plurality of mobile machines including during night operations.

Now referring to the drawings, wherein like reference numbers refer to like elements, there is illustrated an example of a road working operation, particularly a road paving operation, involving a plurality of mobile machines 100 operating in proximity to each other to cooperatively pave a worksite 102 such as a roadway or parking lot. In a paving operation, paving material in a granular or semi-solid state such as asphalt, cement, concrete or other aggregates and the like that may be mixed with binders are transported to the worksite 102 and evenly applied to the ground to provide a smooth, uniform, and hardened surface, layer or mat 104. In a paving operation, each mobile machine 100 may have a dedicated task and be independently navigated and operated by an onboard operator. The mobile machines 100 can align in a paving convoy or paving train proximate to each other and traveling in tandem in a travel direction from right to left as indicated by the arrow 106 in FIG. 1, to conduct different stages of the paving operation. The travel direction 106 therefore refers to the alignment of a plurality of mobile machines 100 in substantially the same direction to cooperatively interact with each other during an operation. To continuously and cooperatively perform their respective tasks, the operations and the relative locations, spacing, and distance of the independent mobile machines 100 must be coordinated and controlled to facilitate continuous performance of the paving operation. Accordingly, to enable communication between the plurality of mobile machines 100, each machine may be operatively associated with a transmitter/receiver 108 using any suitable communications technology such as radio, WiFi, connected area networks, cellular networks, Bluetooth, infrared communications, and the like. In addition to the paving operation illustrated in FIG. 1, aspects of the disclosure may be applicable to other operations involving mobile machines 100 such as mining, farming, and construction.

An example of a mobile machine 100 includes a paver 110 for laying the paving material onto the worksite 102. The paver 110 can include a forward mounted hopper 112 that can receive the paving material and the paver 110 is operatively associated with a floating screed 114 attached at the rear end to spread and compact the material into the solid mat 104 of desired thickness, dimension, and topology. Any suitable paving material may be utilized including asphalt, cement, aggregates, and the like. The screed 114 may be towed behind the paver 110 apply various directional forces to the material discharged therefrom to flatten and smooth out the mat 104. To convey material between the hopper 112 and the screed 114, an internal continuous conveyor 116 may be disposed through the paver 110 longitudinally between the front and the rear. The conveyor 116 can include a belt that continuously travels in a closed loop through the paver 110. In an embodiment, an auger may be utilized instead of or in addition to the conveyor 116.

To continuously lay the material in an uninterrupted mat 104, the paver 110 may be supported on and propelled about the worksite 102 by traction and drive elements 120 such as, for example, wheels or continuous tracks. To power the traction and drive elements 120, the paver 110 may include an onboard power source 122 such as an internal combustion engine or a hybrid engine, while in other embodiments the paver 110 may include onboard batteries or fuel cells for electric operation. To accommodate an onboard operator, the paver 110 can include an operator station 124 in an elevated, exposed location to provide sufficient visibility about the worksite 102. The operator station 124 may also accommodate inputs and controls 126 through which the operator can control operation of the paver 110. Examples of controls 126 may include steering devices for navigating the paver 110 through manipulation of the traction and drive elements 120, controls for the screed 114, discharge controls over the speed or material discharge rate determined via the conveyor 116, and any other suitable style or form of controls. In addition to the operator station 124, an exposed platform 128 may be located toward the rear of the paver 110 generally above the screed 114 from where operators can monitor the condition of the mat 104 being laid by paver 110. In another embodiment, in addition to or instead of the onboard operator station 124, the paver 110 may be configured for off-board or remote operation, for example, such as through a remote control device like a handheld controller communicating via the transmitter/receiver 108 and utilized by an off-board operator at the worksite 102.

To transport material from a remote preparation site to the worksite 102 and supply the paver 110, a mobile machine 100 in the form of a haul truck 130 may also be used in the road paving operation. The haul truck 130 can include a frame 132 and a haul bed 134 pivotally mounted thereon for carrying the material. To enable mobility, the frame 132 can be supported on a plurality of other traction and drive elements such as wheels 136. The pivotally mounted haul bed 134 can be elevated and tilted with respect to the frame 132 to discharge material through a rear tailgate 138 directly into the hopper 112 or just ahead of the paver 110, although in other embodiments, the material may be dumped directly from the bottom of the haul bed 134. Accordingly, to deliver material for use by the paver 110, the haul truck 130 must travel generally in front of and aligned with the paver 110 in the travel direction 106. To power locomotion, the haul truck 130 can also include a power source 140 that can rotatably drive at least some of the wheels 136. The haul truck 130 can also include an operator station 142 to accommodate an onboard operator and any steering, navigation, and system controls for operating the haul truck 130. The operator station 142 may be forwardly disposed on the haul truck 130 in a location to provide sufficient visibility including during travel along the travel direction 106.

Another embodiment of a mobile machine 100 used in paving can include a material transfer vehicle 150, sometimes referred to as a MTV or shuttle buggy, to facilitate consistent supply of material to the paver 110. Because the haul trucks 130 can hold only a finite amount of material and must make repeated runs to and from the worksite 102, the material transfer vehicles 150 assist the paving operation by intermediately receiving material from the haul trucks 130 and temporally storing the material in an onboard bin 152. Material transfer vehicles 150 thus travel in the travel direction 106 in an intermediate position of the paving convoy behind the haul truck 130 and ahead of the paver 110. In an embodiment, the material transfer vehicle 150 can include a series of conveyors 154 arranged to retrieve material discharged from the haul truck 130 proximate the surface of the worksite 102 and transfer the material to the hopper 112 of the paver 110 in a metered or measured manner. The material transfer vehicle 150 can therefore accommodate material surges and provides continuous supply to the paver 110. To enable mobility, the material transfer vehicle 150 can be supported on a plurality of traction and drive devices such as wheels 156. In an embodiment, the material transfer vehicle 150 can include an onboard, exposed operator platform 158 from where operators may monitor and control operation of the vehicle, although in other embodiments, the material transfer vehicle 150 may be navigated and controlled through off-board or remote operation.

Another embodiment of a mobile machine 100 used in a road paving operation illustrated in FIG. 1 can be a compactor 160. Compactors 160 include and are supported on large, rotatable cylindrical rollers 162 and follow behind the paver 110 in the travel direction 106 to further compact and compress the discharged material to complete the hardened and finished mat 104. Multiple compactors 160 of different sizes and weights may be used in a road paving operation. Compactors 160 often must maintain a spaced relation or distance with the paver 110 so that the hot paving materials discharged from the paver 110 have sufficient time to cool prior to contact with the rollers 162. Like the other mobile machines 100, the compactors 160 may include a power source 164 for propulsion and an operator station 166 for accommodating an onboard operator. In possible embodiments, the compactors 160 may also be remotely or autonomously operated.

Referring to FIG. 2, there is illustrated another example of a road working operation, in particular, a road milling operation, involving a plurality of mobile machines 100 cooperatively operating in proximity with each other. In contrast to a road paving operation, in a road milling operation, damaged or dilapidated asphalt or other paving material is removed from the worksite 102 prior to resurfacing. In road milling operations, a cold planer 170, which is sometimes referred to as a road mill, is used to break up and remove one or more layers of pavement from the surface of an existing road, parking lot, or the like. The cold planer 170 can include a large rotating cylindrical milling drum 172 supported in a housing 174 on the planer proximate to the surface of the worksite 102. The cold planer 170 may also include a power source 176 such as an internal combustion engine and traction and drive elements such as continuous tracks 178 to forwardly propel the cold planer 170 in the travel direction 106.

Disposed around the cylindrical periphery of the milling drum 172 can be a plurality of cutting tools 180 having cutters made of carbide, synthetic diamonds, or other hard materials. When the milling drum 172 is rotated and the cold planer 170 travels forward, the cutting tools 180 impact, breakup and dislodge the pavement at the worksite 102. To remove the broken up material, a conveyor 182 is partly disposed internally through the cold planer 170 from proximate the milling drum 172 to a location where the material can be discharged to the haul bed 134 of a haul truck 130 of the foregoing type described with respect to FIG. 1. Many cold planers 170 are of the front loading type meaning the conveyor 182 is forwardly disposed through the cold planer 170 and the haul truck 130 is located ahead of the cold planer in the travel direction 106. The haul truck 130 backs up to the cold planer 170 and travels in the travel direction 106 generally underneath the discharge point of the conveyor 182 to receive material. When the haul truck 130 is filled, it may depart from the worksite 102 and be replaced by another haul truck. To accommodate an operator and the inputs and controls for operation, the cold planer 170 can also include an operator station 184 that, in the illustrated embodiment, may be an exposed location atop of the cold planer 170 to allow visibility over the road milling operation.

To perform road paving and similar operations at night or under conditions of reduced visibility, the mobile machines 100 can be equipped with artificial lights or illumination lamps 190 to illuminate the worksite 102. Such illumination lamps 190 generate and project light beams from electricity or other sources. The illumination lamps 190 may be disposed at different locations about the mobile machine 100 for various purposes. An example of an illumination lamp 190 includes a headlight 192 or head beams mounted to the front of the mobile machine 100 and oriented or aimed to illuminate the worksite 102 in the travel direction 106. Headlights 192 help increase visibility in the travel direction 106 and can provide a visual signal to oncoming traffic or personnel situated in front of the mobile machine 100. Other examples of illumination lamps 190 include work lights such as broad beamed floodlights 194 to illuminate the area of the worksite 102 surrounding the mobile machine 100 to assist in off-board paving work or to enhance visibility in the trailing direction. Floodlights 194 may be positioned high above the mobile machine 100 to project light beams over a wide area. Another embodiment of an illumination lamp 190 includes spotlights 196 that focus the light beam in a particular area for increased illumination, for example, into the hopper 112 to monitor material levels and flow. Other examples of illumination lamps 190 include rearward directed taillights, brake lights, and the like.

The illumination lamps 190 can be of any suitable type or design of artificial lighting. For example, the illumination lamps 190 can be incandescent lamps in which an electric current is applied to a filament that glows and emits visible light as a result. Another example is a light emitting diode (LED) in which the light source is a semiconductor material, specifically a diode, that emits coherent light when a current is applied to it. Other examples include gas-discharge or vapor lamps in which an electric current is discharged through an entrapped gas causing it to ionize and discharge light. Moreover, the illumination lamps 190 can be provided in different colors, intensities, and foci. The arrangement and direction of various illumination lamps 190 about the mobile machine 100 may be subject to industry or government standards, for example, as provided in ISO 12509 "Earth-Moving Machinery—Lighting, Signaling and Marking Lights, and Reflex-Reflector Devices."

Referring to FIG. 3, there is illustrated an embodiment of a lighting control system 200 to control the operation of the illumination lamps 190 in operative association with a plurality of mobile machines 100 including, for example, a paver 110 and a haul truck 130 engaged in a paving operation. The illumination control system 200 can be performed or executed by an electronic controller 202 that can be embodied as a microprocessor, a central processing unit, an application specific integrated circuit (ASIC) or the like. The electronic controller 202 can include appropriate circuitry, including multiple integrated transistors for carrying out computing functions. For example, the electronic controller 202 can be capable of receiving data and instructions, executing or processing that information, and outputting the results. In the illustrated embodiment, the electronic controller 202 may be a single, discrete unit and may be located onboard one of the mobile machines 100 such as the paver 110. In other embodiments, the electronic controller 202 may be distributed among a plurality of distinct and separate components and may be physically located on multiple machines or on off-board or remote devices. The electronic controller 202 may further be a specific purpose device dedicated to executing the illumination control system 200 or may be a general purpose device performing additional operations.

To enable an operator to interact with the electronic controller 202, it may be operatively associated with an interface device 204 that may be disposed in the operator station 124 on the paver 110. In other embodiments in which the mobile machines 100 are configured for remote or autonomous operation, the interface device 204 can be located off-board and can be embodied in a hand held device or in a remote computer system, for example, in a worksite office or command center. The interface device 204 can include various input/output hardware switches, buttons 205, and/or a display 206 through which information can be exchanged, commands can be received, and outputs can be displayed. In an embodiment, the display 206 can be a liquid crystal display with touch screen capabilities. To store and retrieve data and information for the electronic controller 202 in the form of computer-readable software, the electronic controller can be operatively associated with memory 208. Memory 208 may store various instructions, functions, steps, routines, data tables, data structures and the like in the form of computer executable software. Memory 208 can be communicatively linked to the electronic controller 202 and can take any suitable form. For example, memory 208 may be volatile or dynamic memory such as random access memory comprised of numerous memory cells arranged in an addressable format that data can be read and written to. In another example, memory 208 can be non-volatile memory or a more permanent form of memory including hard drives, magnetic disks, optical disks, tapes, erasable programmable memory (EPROM), programmable read only memory (PROM) and other storage mediums.

To communicate with the electronic controller 202, the illumination control system 200 can be operatively associated with a communication network 210. Communication may be established by sending and receiving digital or analog signals across electronic communication lines or communication busses. In an embodiment, the communication network 210 can be, at least in part, a wireless network where information exchange and signaling occurs wirelessly between various network nodes or terminals using, for example, the transmitter/receivers 108 on the mobile machines. Examples of wireless networks can include or utilize radiofrequency communications, WiFi communications, cellular networks, blue-tooth technologies, infrared communications and the like. Any suitable data exchange or transmission protocol can be used such as packet switching, message switching or the like. The communication network 210 can be a private network exclusive to the worksite 102 or can utilize a public data network such as the internet. In some embodiments, at least a portion of the communication network 210 can be established utilizing wires, cables, data buses and like physical communications channels.

In an embodiment, the illumination control system 200 can be configured to control operation of the illumination lamps 190 based at least in part on the distance or proximity between the mobile machines 100. To accomplish this, the illumination control system 200 can include a positioning/location device disposed on a mobile machine such as, for example, the paver 110 that can be configured to operate in conjunction with the electronic controller 202 to determine a proximity distance between the paver 110 and another mobile machine, for example, the haul truck 130. The proximity distance may represent the spatial and dimensional separation between the paver 110 and the haul truck, as measured in meters or feet for example.

In an embodiment, the positioning/location device may be a proximity sensor 220 configured to sense or measure the proximity distance between the paver 110 and the haul truck 130. The proximity sensor 220 may be disposed at the front of the paver 110, for example on the hopper 112, and oriented generally forwardly in the travel direction 106. The proximity sensor can transmit a ranging signal toward another object such as the haul truck 130 and receive a portion of the ranging signal reflected back to the sensor. Using the known speed and direction of the projected ranging signal, the proximity sensor 220 can therefore sense the proximity of another mobile machine 100 such as the haul truck 130 in terms of distance such as meters or feet. The proximity sensor 220 therefore can detect both the presence of the haul truck 130 and measure its range. The proximity sensor 220 may be an optical sensor, an ultrasonic sensor, a laser sensor, radiowave sensor, an infrared sensor, or another type of sensor capable of sensing an object and generating a signal indicative of the proximity or distance between the object and itself. In an embodiment, to assist detection, the haul truck 130 may include reflectors or other signaling devices to transmit its location to the proximity sensor 220.

In another embodiment, the positioning/location device may be a camera based system that captures images of the worksite 102 ahead and analyzes or processes those images to detect the presence of an object like the haul truck 130 and estimate the proximity distance or range. For example, the electronic controller 202 can include software to analyze the captured images from the camera based on characteristics like spatial relations, shading, and the like to estimate the proximity distance between the paver 110 and haul truck 130. In an embodiment, the camera may continuously or repetitively capture images and compare the changes between those images to estimate the proximity distance.

In another embodiment, the positioning/location device may be an onboard receiver 222 disposed on a mobile machine like the paver 110 and configured to determine the location or position of the paver, i.e., its own position, with respect to a reference. To determine its own position, the onboard receiver 222 can receive locating signals transmitted from an off-board source that is spatially separated from the onboard receiver 222 and the paver 110 on which it is disposed. For example, the off-board source may be a satellite navigation system that transmits locating signals from a plurality of satellites 226 in orbit. The locating signals can encode the orbital position of the relevant satellite 226 and the time the satellite 226 sent the transmission. The onboard receiver 222 can compare the locating signals to triangulate the location of the paver 110 with respect to a reference, such as the global coordinate system, with a sufficient degree of accuracy. Examples of suitable navigation systems include GPS, GLONASS, or any other satellite based geotracking system.

Another example of an off-board source can be worksite transmitters 228 disposed about the worksite 102 that the onboard receiver 222 can detect and use to triangulate its relative positions. The off-board transmitters 228 can transmit locating signals in the form of radiowaves, ultrasound, infrared light, or other detectable signals. The off-board transmitter 228 may be mounted on staffs planted in the ground so as to be in an elevated position with respect to the surface of the worksite 102. Further, the worksite transmitters 228 may be located at predetermined positions about the worksite 102 and the locating signals can be indicative of the predetermined location of the worksite transmitter 228. The onboard receiver 222 in conjunction with the electronic controller 202 can analyze or process the locating signals from the worksite transmitters 228 to determine, e.g., through triangulation, the location and position of the associated paver 110 with respect to a reference, such as a worksite map or chart that may be digitally stored in memory 208. Receiving and processing locating signals from an off-board source such as satellites 226 or worksite transmitters 228 results in a first machine position known relative to the reference.

In this embodiment, to determine the proximity distance between two mobile machines 100, such as in the example of the paver 110 and haul truck 130, the illumination control system 200 must receive a second machine position indicative of the location or position of the haul truck 130 relative to the reference. This may be accomplished, for example, by including onboard receivers 222 on the haul truck 130 to detect and transmit its own determined position and location to the illumination control system 200 using the communication network 210. For example, the onboard receiver 222 on the haul truck 130 can receive locating signals from the same or different off-board sources, i.e., satellites 226 or worksite transmitters 228, and use the information encoded therein to resolve or determine its own position or location with respect to the reference, hence resulting in the second machine position.

The haul truck 130 can transmit positioning signals indicative of the second machine position to the illumination control system 200 associated with the paver 110 by, for example, the transmitter/receiver 108 on the haul truck 130 and the communication network 210. The illumination control system 200 receives the positioning signals through the communication network 210, for example, through the transmitter/receiver 108 associated with the paver 110 and can compare the second machine position and the first machine position. Such transmissions of location and position information via positioning signals are an example of machine-to-machine communication. The electronic controller 202 may perform the comparison of the first and second machine positions. The result of the comparison of the first and second machine positions is the proximate distance in, for example, meters or feet. The comparison may be represented by the following exemplary equation:

Proximate Distance=1st Machine Position/Reference−2nd Machine Position/Reference Although the foregoing describes the transmitter/receiver 108, proximity sensor 220, onboard receiver 222, and electronic controller 202 as separate elements, it will be appreciated that their functions may be combined and that various devices and/or technologies can perform some or all of these functions. For example, the transmitter/receiver 108 may be able to perform the operations of the proximity sensor 220 and/or the onboard receiver 222. In addition, while processing and determinations have been described as being made separately by the proximity sensor 220, onboard receiver 222, and electronic controller 202, it will be appreciated that these elements can work in combination with each and that the described processing may be shared or distributed between them.

Figure 4:
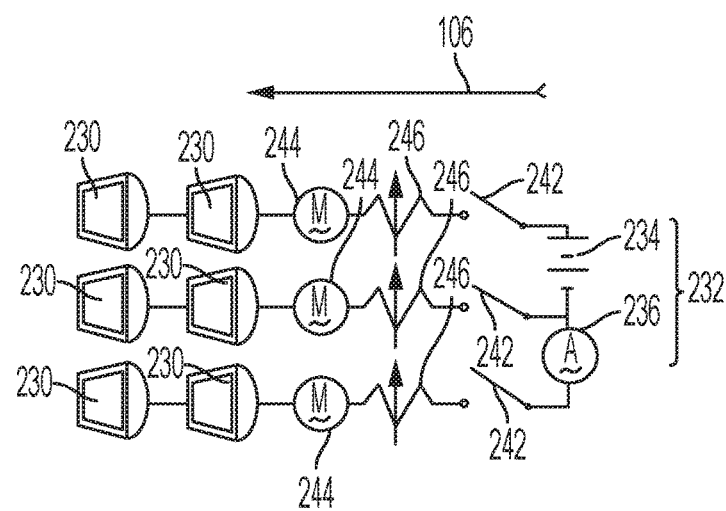
FIG. 4 is a detailed block diagram of showing a plurality of illumination lamps arranged as lighting banks and associated circuitry for selectively controlling the lighting banks.

The illumination control system 200 can be operatively associated with and control the various illumination lamps 190 disposed on the mobile machines 100. For example, referring to FIG. 4, the illumination lamps 190 can be arranged in a plurality of lighting banks 230 operatively associated with each other. Each lighting bank 230 may include a plurality of individual illumination lamps 190, which may be of any of the foregoing types arranged in cells or blocks. The lighting bank 230 in turn may combined to make the headlights, floodlights, or spotlights. The illumination control system 200 can control different aspects or characteristics of the lighting banks 230 to change or alter their individual or combined illumination effect. In an embodiment the lighting banks 230 may be networked through a power circuit 232 that directs electrical power or current to the individual lighting banks provided from, for example, a battery 234 or an alternator 236 that may be disposed onboard the mobile machine 100. Accordingly, the power circuit 232 may be direct current or alternating current.

The illumination control system 200 may switch different lighting banks 230 of the plurality on or off using switches 242 to selectively establish or cut electrical connection to the power circuit 232. Hence, the combined effect of the plurality of lighting banks 230 can be adjusted to control the brightness or luminous intensity emitted. In another example, the individual lighting banks 230 in the plurality may have different directions or orientations and may be selectively turned on or off to adjust the overall pattern or direction of illumination emitted. Relatedly, the individual lighting banks 230 may emit light in different colors, i.e., wavelengths, of the visible spectrum and can be selectively turned on or off to adjust the overall color emitted. In another example, the individual lighting banks 230 can be operatively associated with a motor 244 or actuator and appropriate mechanics that can be used to selectively adjust the direction or orientation of the individual lighting banks. Relatedly, lighting banks 230 oriented in different directions can be selectively combined to change the overall pattern of emitted light. In another example, the individual lighting banks 230 can be operatively associated with a variable resistor 246 or dimmer to selectively control the brightness or luminous intensity of the individual lighting banks 230 and thereby adjust the overall luminous effect.

INDUSTRIAL APPLICABILITY

Figure 5:
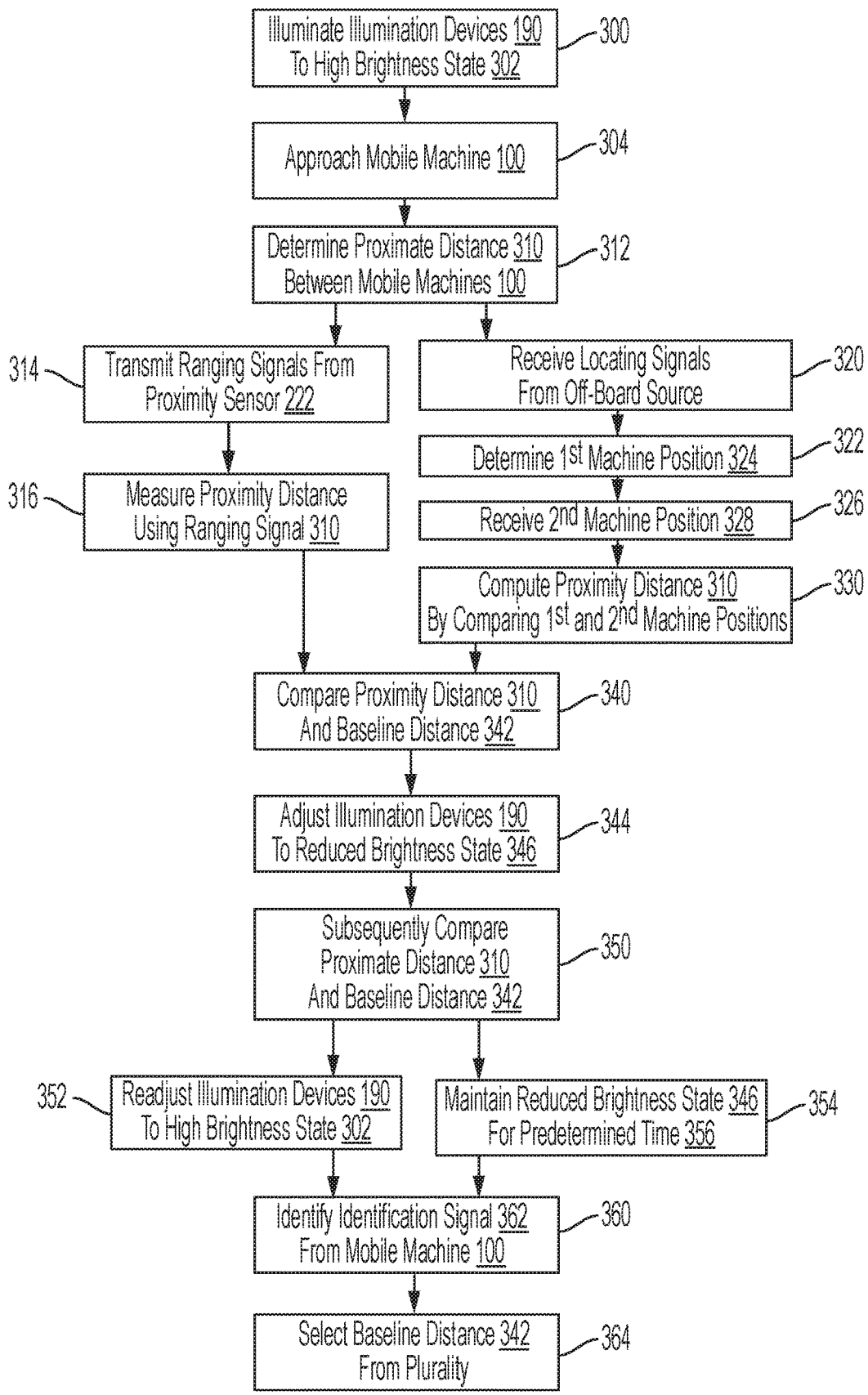
FIG. 5 is a flowchart illustrating a possible routine or process for the illumination control system to coordinate operation of a plurality of mobile machines operating in proximity to each other.

Referring to FIGS. 3 and 5, the disclosure provides a possible process by which the illumination control system 200 can selectively control one or more illumination lamps 190 or lighting banks 230, based at least in part on the relative proximity or distance of the mobile machines, for example, a paver 110 and a haul truck 130. The illumination control system 200, represented as a flowchart in FIG. 5, can be embodied as software including instructions and commands written in computer-executable programming code and can be performed or executed by the electronic controller 202. It should be appreciated the precise and detailed processes described herein are exemplary for the purposes of the disclosure, and aspects of the processes may be used in different operations or in various combinations. The illumination control system 200 can assist multiple mobile machines 100 working in proximity to each other, for example, during a road paving operation.

In accordance with the road paving operation, the paver 110 may initially be traveling in the travel direction 106. In an initial illumination step 300, one or more of the illumination lamps 190 may also be set to provide a desired amount of illumination or brightness about the worksite 102. This may be associated with a high brightness state 302 of the illumination lamp 190 and may include the headlights 192 at the front of the paver 110 aligned in the travel direction 106. As part of the paving operation, the haul truck 130 may need to approach the paver 110 to discharge paving material for reception into the hopper 112, as done in an approach step 304. In an embodiment, the haul truck 130 may approach in reverse with respect to the travel direction 106 so that the haul bed 134 is directed toward the hopper 112 and material may be emptied directly into the hopper or just ahead of the paver 110. In some embodiments, the paver 110 and the haul truck 130 may physically contact each other via a pair of opposing rollers 250 disposed between them. The haul truck 130 may be placed in neutral and pushed in the travel direction 106 by the paver 110.

As the haul truck 130 approaches the paver 110 in the approach step 304, the relative distance or proximity between the mobile machines 100 decreases. Moreover, the haul truck 130 may be equipped with rearview or side view mirrors 252 proximate the operator station 142 to assist in approaching the paver 110 in reverse. In other embodiments, off board individuals or personnel may be situated about the haul truck to assist in operating it in reverse. The high brightness state 302 of the light emitting from the illumination lamps 190 associated with the paver 110, including the headlights 192, may be oriented in a visibly detrimental direction for the reverse approach. For example, excessive glare may be reflected from the mirrors 252 into the operator station 142 or the illumination lamps 190 may be directly in the line of sight of the off-board individuals.

To address the foregoing, the illumination control system 200 in a determination step 312 can determine the proximity distance 310 between the paver 110 and the haul truck 130. The proximity distance 310 can dynamically change as the paver 110 and haul truck 130 approach and, in FIG. 3, may be represented as an arrow between the mobile machines 100. The illumination control system 200 may utilize any of the aforementioned positioning/location devices including the proximity sensor 220 or the onboard receiver 222 to determine the proximity distance 310.

For example, in the embodiment where the positioning/location device is a proximity sensor 220, the proximity sensor 220 in a range signal transmission step 314 may transmit ranging signals from the paver 110 toward the haul truck 130 and receive ranging signals reflected back to it. In a subsequent measurement step 316, the illumination control system 200 possibly using the proximity sensor 220 and/or the electronic controller 202 can measure the proximity distance 310 between the paver 110 and the haul truck 130 using the time-lapse information provided by the ranging signals. The proximity sensor 220 therefore directly measures the proximity distance 310 in absolute terms regardless of a reference.

In the embodiment where the positioning/location device is an onboard receiver 222, the onboard receiver 222 can, in a reception step 320, receive locating signals from an off-board source indicative of its location or position with respect to a reference like the global coordinate system or the worksite map. In a first determination step 322, the illumination control system 200 possibly using the onboard receiver 222 and/or the electronic controller 202 can determine the first machine position 324 associated with the location and/or position of the paver 110 with respect to the reference. In a subsequent reception step 326, the illumination control system 200 can receive positioning signals indicative of the second machine position 328. The illumination control system 200 can determine the proximity distance 310 in a comparison step 330 by comparing the first and second machine positions 324, 328. Comparing first and second machine positions 324, 328 relative to a reference is a way of indirectly determining the proximity distance 310.

In both embodiments, the determination step 312 can be repetitive to continuously measure change in the proximity distance 310. To determine whether an adjustment of the high brightness state 302 is required based on the proximity distance 310, in an embodiment, the illumination control system 200 can compare the proximity distance 310 with a predetermined baseline distance 342 in a comparison step 340. The predetermined baseline distance 342 may represent the predetermined distance between the paver 110 and haul truck 130 at which the existing high brightness state 302 for the illumination lamps 190 is detrimental to the paving operation. The predetermined baseline distance 342 may be stored as a value in memory 208 as part of the illumination control system 200.

As a result of the comparison step 340, the illumination control system 200 in an illumination adjustment step 344 may adjust the illumination state of the illumination lamps 190. For example, the determined proximity distance 310 may be equal to or less than the predetermined baseline distance 342 such that the illumination lamps 190 change from the high brightness state 302 to a reduced brightness state 346. This may be accomplished by, for example, any of the foregoing adjustments such as reducing brightness or luminous intensity of some or all of the plurality of individual illumination lamps 190 or lighting banks 230, selectively turning on or off specific illumination lamps 190 or lighting banks 230, and selectively changing the direction of some or all of the plurality of illumination lamps 190 or lighting banks 230. Adjustment can be also done by changing the combined wavelengths and thus the color of emitted light.

The illumination control system 200 may maintain the reduced brightness state 346 so long as the paver 110 and the haul truck 130 are in sufficient proximity to cooperatively perform the paving operation. In another example, the cold planer 170 and haul truck 130 may also need to work in tandem along the travel direction 106 and in close proximity to each other for a prolonged duration during which the high brightness state 302 of the illumination lamps 190 may produce a detrimental glare. The illumination control system 200 can be configured to maintain the reduced brightness state 346 during the cooperative operation in which the mobile machines 100 are spatially proximate to each other. The illumination control system 200 may determine when the cooperative interaction between the paver 110 and haul truck 130 has ceased in a subsequent and repetitive comparison step 350 by continuously measuring and comparing the proximate distance 310 with the predetermined baseline distance 342. If, for example, the haul truck 130 has completely discharged its load of material, it may depart from the worksite 102 thereby increasing the measured proximity distance 310 between it and the paver 110. When the subsequent comparison step 350 determines the measured proximity distance 310 is greater than or exceeds the predetermined baseline distance 342, the illumination control system 200 may in a readjustment step 352 return the illumination lamps 190 to their original high brightness state 302, which may be beneficial for continued operation of the paver 110 if there is nothing else ahead of it. In other embodiments, instead of adjusting between high and reduced brightness states 302, 346 based on a single predetermined baseline distance 342, the illumination control system 200 can adjust the illumination lamps 190 in direct proportionality to changes in the proximity distance 310, i.e., in finer degrees. For example, as the positioning/location device and/or electronic controller determine the haul truck 130 is getting gradually closer to the paver 110, the lighting control system 200 may respond by correspondingly gradually adjusting the illumination lamps 190. The electronic controller 202 may include programming correlating gradual degrees in the proximity distance with gradual adjustments to the illumination lamps. In other embodiments, the illumination control system 200 can execute a timing step 354 in which the reduced brightness state 346 may be maintained for a predetermined time 356, which may also be stored as a value in memory 208.

While the foregoing example has been described with respect to cooperative interaction between a paver 110 and haul truck 130, the disclosure is applicable to other operations as well. For example, referring to FIG. 1, the compactors 160 that follow the paver 110 in the travel direction 106 may likewise be equipped with headlights 192 that may be directed into the operator station 124 or platform 128 on the paver 110. The headlights 192 on the compactors 160 may be undesirably bright at certain distances, especially if the distance between the compactors 160 and paver 110 change during the course of the paving operation to allow the mat 104 to cool. The illumination control system 200 can apply to the compactor 160 to selectively adjust the headlights 192 thereon during the operation. Referring to FIG. 2, the cold planer 170 may also be equipped with headlights 192 and must operate in close proximity to the haul truck 130 for prolonged periods during a milling operation to discharge milled material into the haul bed 134 of the haul truck 130. The illumination control system 200 can apply to the cold planer 170 to selectively adjust the headlights 192 between a high brightness state 302 and a reduced brightness state 346 during this operation. Moreover, when the haul truck 130 has reached the hauling capacity of the haul bed 134, it may depart from the worksite 102. The illumination control system 200 can readjust the illumination lamps 190 on the cold planer 170 to the high brightness state 302 to signal for a replacement haul truck 130.

Referring to FIGS. 3 and 5, in an embodiment, the illumination control system 200 can be configured to facilitate cooperative operation of mobile machines 100 between different companies or organizations. For example, haul trucks 130 may often be provided from a variety of sources and have different hauling capacities and with different arrangements of the operator station 142 and mirrors 252. Accordingly, the illumination control system 200 can store a plurality of predetermined baseline distances 342 for different versions of haul trucks 130. As different versions of the haul trucks 130 approach the paver 110, they may signal an identification signal 362 in an identification step 360 identifying their make or model to the paver 110 using the transmitter/receivers 108. In a selection step 362, the illumination control system 200 can process the identification signal to select the appropriate predetermined baseline distance 342 for selectively adjusting the illumination lamp 190 and/or lighting banks 230 during the paving operation for the respective haul truck 130. In a further embodiment, wherein the reduced brightness state 346 may be maintained for a predetermined time 356, the predetermined time 356 may be associated with a capacity of the specific haul truck 130. Accordingly, in the timing step 354, illumination control system 200 can maintain the reduced brightness state 346 of the illumination lamps 190 for the predetermined time 356 then change to the high brightness state 302 as a signal to the haul truck 130 that its material capacity has been reached.

A possible advantage of the disclosure is that it can control the illumination of a mobile machine in coordination with other mobile machines working in proximity with it. A related possible advantage is that as proximity increases between mobile machines, for example, as a haul truck departs from its position ahead of a paver, the illumination control system can return the illumination lamps to their optimal level of illumination until another haul truck arrives. Another possible advantage is that the illumination control system facilities remote or autonomous operation of mobile machines because an operator is not required to be present on the machine to determine if the illumination requires adjustment. These and related possible advantages will be apparent from the disclosure.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. An illumination control system for a mobile road working machine comprising:
   at least one illumination lamp disposed on a first mobile road working machine and directed in a common travel direction of the first mobile road working machine;
   a positioning/location device disposed on the first mobile road working machine configured to receive a signal used to determine a proximity distance of the first mobile road working machine with respect to a second mobile road working machine traveling in the common travel direction to cooperatively interact through conveyance of road material with the first mobile road working machine; and
   an electronic controller configured to adjust the illumination lamp disposed on the first mobile road working machine based on the proximate distance, by comparing of the proximity distance between the first mobile road working machine and a second mobile road working machine with a predetermined baseline distance, to facilitate cooperative interaction of conveyance of road material between the first and second mobile road working machines in the common travel direction;
   the electronic controller further configured to repetitively measure and compare the proximate distance with the predetermined baseline distance and maintain adjustment of or readjust the illumination lamp in direct response to changes in the proximity distance between the first mobile road working machine and a second mobile road working machine while the first mobile road working machine and the second mobile road working machine cooperatively interact through conveyance of road material within the proximity distance.

2. The illumination control system of claim 1, wherein the positioning/location device is a proximity sensor configured to receive a ranging signal to measure the proximity distance between the first mobile road working machine and the second mobile road working machine.

3. The illumination control system of claim 2, wherein the proximity sensor is selected from the group comprising an optical sensor, a ultrasound sensor, a laser sensor, and a radiowave sensor.

4. The illumination control system of claim 1, wherein the positioning/location device is an onboard receiver configured to receive locating signals from an off-board source, and the electronic controller is further configured to determine a first machine position based on the locating signals.

5. The illumination control system of claim 4, further comprising a transmitter/receiver configured to receive positioning signals from the second mobile road working machine indicative of a second machine position, and the electronic controller is further configured to determine the proximity distance by comparing the first machine position with the second machine position.

6. The illumination control system of claim 5, wherein the off-board source is selected from the group comprising satellites and worksite transmitters.

7. The illumination control system of claim 1, wherein the illumination lamp is adjusted between a high brightness state and a reduced brightness state.

8. The illumination control system of claim 7, where the electronic controller is further configured to compare the proximity distance with a predetermined baseline distance to adjust the illumination lamp.

9. The illumination control system of claim 8, wherein the illumination lamp is adjusted by controlling a characteristic selected from the group comprising luminous intensity, direction, power, and color.

10. A method of controlling illumination lamps on a mobile road working machine comprising:
    illuminating at least a portion of a worksite with at least one illumination lamp disposed on a first mobile machine and directed in a common travel direction;
    approaching the first mobile road working machine with a second mobile road working machine traveling in the common travel direction to cooperatively interact through conveyance of road material with the first mobile road working machine;
    determining a proximity distance between the first mobile road working machine and the second mobile road working machine in the common travel direction;
    adjusting the illumination lamp based on the proximity distance, by comparing of the proximity distance between the first mobile road working machine and a second mobile road working machine with a predetermined baseline distance, to facilitate cooperative interaction of conveyance of road material between the first and second mobile road working machines in the common travel direction; and
    repetitively measure and compare the proximate distance with the predetermined baseline distance and maintaining adjustment of or readjust the illumination lamp in direct response to changes in the proximity distance between the first mobile road working machine and a second mobile road working machine while the first mobile road working machine and the second mobile road working machine cooperatively interact through conveyance of road material within the proximity distance.

11. The method of claim 10, wherein the step of determining the proximity distance comprises measuring the proximity distance between the first mobile road working machine and the second mobile road working machine with a proximity sensor disposed on the first mobile road working machine.

12. The method of claim 11, wherein the proximity sensor is selected from the group comprising an optical sensor, an ultrasound sensor, a laser sensor, and a radiowave sensor.

13. The method of claim 10, wherein the step of determining the proximity distance further comprises: determining a first machine position at a worksite based on locating signals received from an off-board source; receiving positioning signals indicative of a second machine position; and comparing the first machine position and the second machine position.

14. The method of claim 13, wherein the locating signals are sent from one of a GPS satellite and off-board transmitter at the worksite.

15. The method of claim 14, wherein the positioning signals indicative of a position of the second mobile road working machine are determined by the second mobile road working machine receiving locating signals from the off-board source.

16. The method of claim 10, further comprising repetitively determining the proximity distance and readjusting the illumination lamp based on a change in the proximity distance.

17. A first mobile road working machine configured for cooperative interaction with a second mobile road working machine by conveying road material there between, the first mobile road working machine comprising:
    at least one illumination lamp directed in a common travel direction of the first mobile road working machine, the first mobile road working machine comprising one of a paver and a cold planar;
    a locating/positioning device configured to receive a signal used to determine a proximity distance between the first mobile road working machine and a second mobile road working machine approaching in the common travel direction, the second mobile road working machine comprising one of a haul truck and a material transfer vehicle; and
    an electronic controller configured to adjust the illumination lamp based on the proximity distance, by comparing of the proximity distance between the first mobile road working machine and a second mobile road working machine with a predetermined baseline distance, to facilitate cooperative interaction of conveyance of road material between the first and second mobile road working machines in the common travel direction;
    the electronic controller further configured to repetitively measure and compare the proximate distance with the predetermined baseline distance and maintain adjustment of or readjust the illumination lamp in direct response to changes in the proximity distance between the first mobile road working machine and a second mobile road working machine while the first mobile road working machine and the second mobile road working machine cooperatively interact through conveyance of road material within the proximity distance.

18. The first mobile road working machine of claim 17, wherein the locating/positioning device is selected form the group comprising i) a proximity sensor configure to send and receive ranging signals and ii) an onboard receiver configured to receive locating signals from an off-board source.

19. The first mobile road working machine of claim 17, wherein the first mobile road working machine is a paver and the second mobile road working machine is a haul truck disposed ahead of the paver in the travel direction.

20. The first mobile road working machine of claim 17, wherein the first mobile road working machine is a cold planer and the second mobile road working machine is a haul truck disposed ahead of the cold planer in the travel direction.

* * * * *